United States Patent [19]
Barton et al.

[11] Patent Number: 5,254,289
[45] Date of Patent: Oct. 19, 1993

[54] NONLINEAR OPTICAL AND CONDUCTIVE POLYMERIC MATERIAL

[75] Inventors: Thomas J. Barton; Sina Ijadi-Maghsoodi; Yi Pang, all of Ames, Iowa

[73] Assignee: Iowa State University, Ames, Iowa

[21] Appl. No.: 877,925

[22] Filed: May 4, 1992

Related U.S. Application Data

[60] Division of Ser. No. 594,481, Oct. 9, 1990, Pat. No. 5,115,062, which is a continuation-in-part of Ser. No. 442,946, Nov. 29, 1989, abandoned.

[51] Int. Cl.$^5$ .............................................. H01B 1/06
[52] U.S. Cl. .................................. 252/520; 252/500; 252/518; 252/519
[58] Field of Search ................ 252/520, 500, 518, 519

[56] References Cited

FOREIGN PATENT DOCUMENTS 115911 5/1986 Japan.
50332 3/1987 Japan.

OTHER PUBLICATIONS

T. J. Katz, J. Am. Chem. Soc. 1984, 106, 2659-2668, Polymerizations of Acetylenes & Cyclic Olefins induced by Metal Carbynes, (Aug. 15, 1983).
T. J. Katz, J. Am. Chem. Soc. 102:1, Jan. 2, 1980, 422-424, Initiation of Acetylene Polymerization by Metal Carbenes. (Jul. 12, 1979).
T. J. Katz, J. Am. Chem. Soc. 1985, 107, 737-738, Metal-Catalyzed Rearrangement of Alkene-Alkynes & the Stereochemistry of Metallacyclobutene Ring Opening. (Sep. 17, 1984).
M. G. Voronkov, J. Polymer Science: Polymer Chemistry Ed., vol. 18, 53-57, 1980, Polymerization of Acetylene & its Monosubstitutes in the Presence of Halides & Oxohalides of Molybdenum & Tungsten.
Q. Ni, APS 1989 Mar. Meeting at St. Louis, vol. 34, No. 3, 1989, Light Induced ESR Study of Polysiloles & Polygermoles, and ESR & Coductivity Study of Insulating & Semiconduction Polysiloles & Polygermoles.
J. Shinar, Synthetic Metals, 28, 1989, C593-C598, Synthesis & Study of a Polysilole.
L. K. Luneva, Institute of Heteroorganic Compounds, Academy of Sciences of USSR, No. 1, 170-174, 1968, Synthesis of Organosilicon & Organogermanium Polymers Containing Diacetylenic Groupings in the Chain.
T. Kusumoto, Chem. Letters, 1119-1152, 1988, Chem. Soc. of Japan, Polymerization of Monomers Containing 2 Ethynyldimethylsilyl Groups.
A. C. Dema, J. Am. Chem. Soc., 1989, 111, 7615-7616, Transformation of Ph$_2$Si(C≡CCMe$_3$)$_2$ to a 4-Alkylidene-1-silacyclobut-2-enyl Ligand by Pt-Addition & Rearrangement Reactions.
Y.-S. Gal, J. Polymer Science: Part A: Polymer Chem., vol. 27, 31-41, 1989, Polymerization of 1-Aryl-2--Trimethylsilylacetylenes by Transition Metal Catalysts (II).
Y.-S. Gal, J. Polym. Sci. Polym. Chem. Ed. vol. 25, 1987, pp. 2323-2326, Polymerization of 1-Phenyl-2--Trimethylsilylacetylene by Transition Metal Catalysts.
T. Masuda, Am. Chem. Soc. 1989, Macromolecules, 1989, 22, 1036-1041, Polymerization of 3-Silyl-1-hexynes & Polymer Properties.
T. Masuda, Am. Chem. Soc. 1985, Macromolecules 1985, 18, 841-845, Polymerization of 1-(Trimethylsilyl)-1-propyne by Halides of Niobium & Tantalum (V) & Polymer Properties.
Y. Okano, J. Polym. Sci. Polym. Chem. Ed., vol. 22, 1603-1610, 1984, Polymerization of Trimethylsilylacetylene by WCl$_6$-Based Catalysts.
H. Tajima, J. Polym. Sci. Part A: Polym. Chem., vol. 25, 2033-2042, 1987, Polymerization of Silylacetylenes by W & Mo Catalysts.
Novikova et al, "Some Properties of Polymers Based on DI- and Triethynylalkyl(Aryl)Silanes" 1968.

Primary Examiner—Joseph L. Schofer
Assistant Examiner—N. Sarofim
Attorney, Agent, or Firm—James E. Bittell

[57] ABSTRACT

A polymeric material which exhibits nonlinear optical properties if undoped and conductive properties if doped. The polymer is prepared by polymerizing diethynylsilane compositions, the resulting polymeric material having a weight average molecular weight between about 20,000 and about 200,000 grams per mole. The polymer is prepared and catalytically polymerized by exposure to a catalyst, such as MoCl$_5$ or W(CO)$_6$/hv.

16 Claims, No Drawings

NONLINEAR OPTICAL AND CONDUCTIVE POLYMERIC MATERIAL

The United States Government has rights in this invention pursuant to Contract No. W-7405-Eng-82 awarded by the United States Department of Energy.

This is a divisional of copending application Ser. No. 07/594,481 filed on Oct. 9, 1990, now U.S. Pat. No. 5,115,062, which was a continuation-in-part of Ser. No. 07/442,946, filed on Nov. 29, 1989, abandoned.

TECHNICAL FIELD

This invention relates generally to polymeric materials, and more specifically relates to a polymeric material which can be doped to form an electrically conductive material, or undoped to form a material which has nonlinear optical properties.

BACKGROUND OF THE INVENTION

The development of fiber optics has created a need for high performance new nonlinear optical materials which can be used in optoelectronic devices for integrated optical systems. Input devices must be fabricated to allow the conversion of the photonic to electronic signal for telephones, TV's, VCR's and personal computers. The photonic input is generated by lasers which are already used in Supermarket Barcode Readers, Compact Disc Players, Fax machines, or Laser Printers. The photonic signal must be demultiplexed, split, switched and routed. The search is on for optical equivalents of electrical connectors, resistors, capacitors, transistors, dielectrics and transformers. Waveguides and optical switches are examples of such optical equivalents.

The unusual optical properties of certain polymers make them useful in the field of optical computing, or optoelectronics, which is aimed at replacing electronic microchips that operate using electricity with optoelectronic devices that would operate with pure light at much greater switching speeds. For example, a standard silicon microchip will work at a speed in the range of microseconds, while a gallium arsenide microchip has switching speeds on the order of nanoseconds, and optoelectronic materials made out of conductive polymers generally have a switching speed in the picosecond range.

Research and engineering personnel are testing conductive materials as optical switches, the optical counterparts of transistors. To date, polydiacetylene has appeared to create a device that allows switching on a picosecond time scale. A desired material would have an exceptionally high optical nonlinearity so that switching can be done with inexpensive, low-intensity die lasers. Most of the tested optical switches recently formed have required a much more intense light to function properly. Unfortunately, the above-mentioned polydiacetylene is a disadvantageous material for optical devices because it absorbs light as strongly as it distorts it. It is the distortion enabled by the chemical structure of the conductive polymers which interferes with the propagation of light through the material, thus forcing the speed of light to vary with the intensity of the light. A search is currently on to look for a conductive polymer which will combine high nonlinearity with good transparency.

Nonlinear optical devices are devices based on a class of optical effects that result from the interaction of electromagnetic radiation from lasers with nonlinear materials. Nonlinear means that the effect depends on the intensity of the light. Nonlinear effects are due to the nonlinear contribution to the polarization of the medium, which can be expressed as a power series expansion in the incident electric field E by the following equation $$P = E_0(X^{(1)}E + X^{(2)}E^2 + X^{(3)}E^3 + \ldots)$$

wherein $X^{(1)}$ is the linear, and $X^{(2)}$ and $X^{(3)}$ are second- and third-order susceptibilities, respectively. $X^{(2)}$ has a nonzero value only in materials that do not possess inversion symmetry, but $X^{(3)}$ is usually nonzero in all materials. Four-wave mixing and phase conjugation are examples of third-order, $X^{(3)}$ nonlinear effects. Optical bistability, which can also be expressed as a $X^{(3)}$ mechanism, occurs when the nonlinearity is coupled with feedback.

Nonlinear optical devices can be classified roughly into two categories: (1) $X^{(2)}$ devices that generate light at new frequencies and (2) $X^{(3)}$ devices that process optical signals. The second category contains waveguides, four-wave-mixing beam deflectors, phase-conjugate mirrors, etalon switches and logic devices. Current emphasis is being placed on waveguide applications.

Four-wave-mixing beam deflectors have been found to be especially useful for optical techniques for intracomputer communications and have become increasingly popular because of the limit imposed by the electronic interconnections on the scale-downs of computer circuits. One method that has been assessed for optical interconnection is the use of holographic elements to diffract the light to the desired locations. Holographic arrays may someday replace the huge number of wires or buses that are used inside the computer to transfer information. However, conventional holograms are not programmable and would have to be replaced every time a different set of pixels was to be accessed.

Four-wave mixing is one of the avenues that has been investigated to perform real-time programmable holography. Dynamic gratings that are generated by four-wave mixing may be able to deflect light originating from a source on a very large-scale integrated circuit (VLSI) chip to a spot on the same chip or to another VLSI chip. If the light is desired to illuminate a different spot, the direction of the grating must be changed; this can be accomplished by changing the angle at which the two "write" beams intersect.

Nonlinear optics is a field of study concerned with the interaction of electromagnetic radiation and matter in which the matter responds in a nonlinear manner to the incident radiation fields. The nonlinear response can result in intensity-dependent variation of the propagation characteristics of the radiation fields or in the creation of radiation fields that propagation at new frequencies or in new directions. Nonlinear effects can take place in solids, liquids, gases, and plasmas, and may involve one or more electromagnetic fields as well as internal excitations of the medium. The wavelength range of interest generally coincides with the spectrum covered by lasers, extending from the far infrared to the vacuum ultraviolet, but some nonlinear interactions have been observed at wavelengths extending from the microwave to the x-ray ranges. Historically, nonlinear optics precedes the laser, but most of the work done in the field has made use of the high powers available from lasers.

Nonlinear effects of various types are observed at sufficiently high light intensities in all materials. It is convenient to characterize the response of the medium mathematically by expanding it in a power series, as described hereinabove, in the electric and magnetic fields of the incident optical waves. The linear terms in such an expansion give rise to the linear index of refraction, linear absorption, and the magnetic permeability of the medium, while the higher-order terms give rise to nonlinear effects.

Certain requirements for nonlinear optical materials have been promulgated which indicate the characteristics of an ideal nonlinear optical material are as follows:
1. large nonlinear optical response,
2. low switching energy,
3. rapid switching times,
4. nondispersive,
5. mechanically tough and formable,
6. high damage thresholds,
7. formable into thin films and coatings,
8. easy to manufacture,
9. useful at high and low temperatures, and
10. immune to corrosive and oxidative environment.

Polymeric materials are currently being investigated for many different applications. Conductive polymers are currently being used for plastic batteries, anti-static coatings, and heat reflective coatings and electromagnetic shields. Conductive polymeric fiber clothing may be used by workers to ward off static during the production of semiconductors, complicated parts and during medical operations. It has been speculated that conductive polymeric paint may be used to coat computer cabinets or even entire buildings to keep electromagnetic radiation from leaking into the atmosphere. There have been many years of research which have been directed towards the optimization of polyacetylene as a conductive polymer. Plain polyacetylene does not conduct electricity very well unless it is doped to enhance the conductivity by several orders of magnitude.

Problems posed by conductive polymer materials include poor stability in air and a stubborn resistance to being processed due to their insolubility in common solvents. The stability problem arises in conductive polymers because the chain of carbon atoms are connected by alternating single and double bonds, which prove to be extremely weak conductors. When the materials are oxidized, their conductivity can rise by many orders of magnitude. However, therein lies the problem; the gaps left by the lost electrons provide a pathway for electronic charges to be conducted down the polymeric chain. At the same time, this same property makes the conductive polymer highly reactive with water, such as the humidity in air, which is increased at high temperatures. Generally, conductive polymers would be exposed to high temperatures during their operation, and this would increase the reactivity of the conductive polymer with the humidity in the air.

Furthermore, conductive polymeric materials exhibit a resistance to processing which stems from the fact that the polymers form rigid, tightly packed chains. While the tight packing of the chains is essential for electric charges to be able to jump from one molecule to the next as the current moves through the polymer, this also means that the polymer as a whole is a hard, insoluble mass because the polymer chains resist intermixing with solvent molecules. This tends to render the polymers unprocessible and essentially unformable into fibers, thin films and coatings.

As researchers gained knowledge about the conductive polymers during the 1980's, they solved the stability problem by incorporating less reactive atoms such as sulfur, nitrogen and oxygen into the polymeric backbone. For example, a particularly successful polymer is polypyrrole, a chain of five member rings, each of which contains a nitrogen atom. Several Japanese firms, including Nippon Electric, now sell high frequency capacitors containing polypyrrole as the solid electrolyte. Structurally analogous polypyrrole compounds having sulfur and oxygen atoms instead of the nitrogen, polythiophene and polyfuran, have also proved to be stable and conductive, although they were still presented with the processibility problem. Different side chains to the basic polymers were tested by trial and error to attack the processibility problem.

Therefore, it is an object of the present invention to provide a conductive polymer which is stable in high temperatures, has a high molecular weight, and is easily processible to form fibers, thin films, coatings, or bulk materials so that articles of manufacture may be easily fabricated.

Traditionally, it had been reported by Luneva, et al. in 1968 that heating diphenyldiethynylsilane afforded a low molecular weight (about 2700 to 5000), red, soluble polymer which was claimed to have a straight chain structure containing diacetylenic groupings. Diphenyldiethynylsilane was heated at 180° to 200° to form a reddish-brown polymeric solid which was soluble in benzene or toluene. This conventional material experienced problems due to its low molecular weight.

Improved polymeric materials which increase the conjugation of the polyenes, such as polyacetylene and polydiacetylene were described by Kusumoto and Hiyama in 1988. Their materials were disclosed for conductivity applications. In spite of the promising conductive properties, the instability of the polymers to atmospheric oxygen severely limited their use. Substitution of the polymers endowed a remarkable stability at the total expense of the conductivity, however. Therefore, Kusumoto et al. attempted to synthesize a soluble, air-stable and conductive polymer by cyclopolymerization of monomers containing two ethynyldimethylsilyl groups. The polymerization was catalyzed with a $WCl_6$ or $MoCl_5$ catalyst which rendered polymer, soluble in common organic solvents. The polymers were doped to improve their conductivity. Their materials were of low molecular weights, from about 2800 to 3900, and colored yellow or red to brown. The results do not include a blue or violet polymer.

These examples of previous attempts to produce a stable, easily processible conductive polymer when doped, and to produce a high quality nonlinear optical polymeric material when left undoped are described above. As can be seen from their experimental data, they may have solved one or two of the problems, but they did not solve all of the problems.

Therefore, it is a primary object of the present invention to provide a polymeric material in accordance with the present invention which produces a blue or violet polymer which exhibits highly enhanced nonlinear optical properties. This polymeric material should be easily processible, have a high molecular weight and should be stable in high temperatures.

It is yet another object of the present invention to provide a conductive polymeric material which exhibits an enhanced conductivity in the range of $10^{-2}$ to $10^1$ S/cm in a material which is easily processible, easy to dope and stable in air.

SUMMARY OF THE INVENTION

In accordance with a preferred embodiment of the invention, the above-mentioned objects and advantages are addressed as follows. A polymeric material capable of exhibiting nonlinear optical properties, if left undoped, and capable of being conductive, if doped, is formed by polymerizing diethynylsilane compositions. The conductivity of the polymer can be enhanced many orders of magnitude by exposure to a dopant, such as iodine or arsenic pentafluoride.

The diethynylsilane monomers include compounds having a structure of $R_2Si(C\equiv CH)_2$, wherein each R may be independently selected from an aryl or alkyl substituent of 1 to 20 carbon atoms. The diethynylsilanes may be catalytically polymerized by exposure to a catalyst such as $MoCl_5$ and $W(CO)_6/h\nu$.

One structure proposed for the polymer includes a silacyclobutene ring within a predominately polyacetylene chain. The polymer is thus postulated to include repeating units with a four-member ring represented as follows:

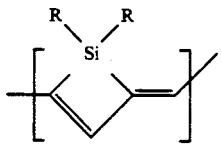

wherein each R may be independently selected from an aryl or alkyl substituent of 1 to 20 carbon atoms.

DETAILED DESCRIPTION OF THE INVENTION

The polymers of this invention were discovered in conjunction with a reinvestigation of the thermal polymerication of diphenyldiethynylsilane as reported by Luneva et al. Polymers with unit structure [—SiPh$_2$C≡C—C≡C—] as claimed from the thermal polymerization of diphenyldiethynylsilane by Luneva et al., were synthesiszed, by another route, and found to exhibit very different properties from the polymer we obtained by thermal polymerization of diphenyldiethynylsilane according to the procedure described by Luneva et al. Further studies resulted in our discovery that the polymerization of diethynylsilanes by certain catalysts produces new polymers with useful properties.

From spectral studies and molecular models, we tentatively have concluded that the new polymers contain a polysilacyclobutene structure. The new polymers may be applicable for both nonlinear optical material applications as well as conductive polymeric applications.

The material is very attractive for nonlinear optical studies. Because our proposed structure contains a polyacetylene chain, the possibility of electrical conduction was also presented. Although the polymer is an insulator, doping it with arsenic pentafluoride or iodine increased the conductivity by several orders of magnitude. In addition, a particular advantage is the fact that the polymer can be pulled into fibers or cast into films. It is air stable even at elevated temperatures. The polymer is believed to possess a polyacetylene chain in the form of repeating units having a general structure containing a four-membered ring as follows:

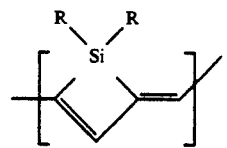

wherein each R may be independently selected from an aryl or alkyl substituent of 1 to 20 carbon atoms, with the preferred substituents being selected from the group consisting of phenyl, ethyl, methyl, s-butyl, i-butyl, n-hexyl, i-propyl and n-propyl.

While the polymers of this invention are believed to be best represented by the silacyclobutene structure described above, it should be understood that other structural units may be incorporated in the polymer chain. For example, the polymer may contain units described as a silicon analogue of polythiophene represented as follows:

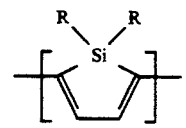

The proposed structures for the units of the polymer are presented to assist in describing the polymer, but should not be understood as limiting the scope of the polymers as prepared by the processes of this invention.

Generally, the polymer is formed by catalytically polymerizing a diethynylsilane monomer to a high molecular weight, on the order of between about 20,000 and 200,000 grams per mole. Of particular interest is the polymer which includes repeating silacyclobutene units with a predominant polyacetylene chain structure, this material also having a molecular weight between about 20,000 and about 200,000 grams per mole. The catalysts which have shown the greatest promise include $MoCl_5$ and $W(CO)_6/h\nu$.

The diethynylsilane monomers which may be polymerized to produce the polymers of this invention include diethynylsilanes having a structure of $R_2Si(-C\equiv CH)_2$, wherein each R may be independently selected from an aryl or alkyl substituent of 1 to 20 carbon atoms, with the preferred substituents being selected from the group consisting of phenyl, ethyl, methyl, s-butyl, i-butyl, n-hexyl, i-propyl and n-propyl.

Diethynylsilane monomers having two of the same R groups on silicon or having two different groups on silicon can be used to prepare the polymers of this invention. For example, useful monomers include diphenyldiethynylsilane, di-n-propyldiethynylsilane, di-n-butyldiethynylsilane, di-iso-propyldiethynylsilane, di-sec-butyldiethynylsilane, methylphenyldiethynylsilane, sec-butylmethyldiethynylsilane, and ethyl-iso-propyldiethynylsilane. Generally, it is preferred that at least one of the R groups be a bulky alkyl group containing 3 or more carbon atoms. Such bulky alkyl groups may favorably influence the nonlinear optical properties of the polymers obtained. Accordingly, polymers where both R groups are identical bulky alkyl groups are more preferred both from an economic view point and for their exceptional nonlinear optical properties.

Polymerization of the diethynylsilanes is typically carried out in a solvent. Most solvents without an active hydrogen are suitable for use. Of course, solvents that react with or otherwise inactivate the catalyst should be avoided. Useful solvents include aromatics such as benzene, toluene, xylene and anisole; chlorinated hydrocarbons such as carbon tetrachloride and chloroform and hydrocarbons such as hexane, cyclohexane and heptane. Aromatic or chlorinated hydrocarbons are preferred because of the higher yields of polymers usually obtained with such solvents.

The concentration of the monomer in the solvent is not critical and may vary over a wide range. Concentrations of 1 to 10% by weight of monomer in solvent are typically used, but any concentration from 0.1 to 50% should be useful. Generally lower concentrations are expected to favor intramolecular reaction so that polymer formed at low concentration may contain a higher proportion of units such as the silacyclobutene-containing unit illustrated above.

The polymerization should be conducted in the absence of water and oxygen because they tend to deactivate the catalyst. Solvents and vessels should be dried and an inert atmosphere provided to assure exclusion of oxygen. Any nonreactive inert gas can be used such as argon or nitrogen.

The polymerization can be carried out at any convenient temperature from 20° C. to the boiling point of the solvent with a temperature of about 40° to about 80° C. typically most useful. Generally, it is preferred to employ a temperature sufficiently high to provide an economically effective reaction rate but low enough to favor intramolecular reaction and thus produce a polymer with a higher proportion of silacyclobutene-containing units. It is preferred that the solution of catalyst and solvent be stirred during the polymerization, but extensive agitation is not required.

The rate of polymerization will vary substantially with the specific catalyst, the amount of catalyst, the temperature and other conditions. Polymerization may be complete in 15 minutes or may require up to 24 hours. The course of the polymerization may be monitored by analyzing portions of the solution for unreacted monomer. It is preferred to kill the catalyst upon the depletion of monomer to reduce or control the extent of branching or cross linking that may occur due to the presence of polymer units containing a dangling ethynyl group. Some polymer units with pendant (also referred to as "dangling") ethynyl groups are believed to occur randomly in the polymers as a result of a competing intermolecular polymerization reaction occurring prior to the intramolecular reaction with the other ethynyl group on the same silicon atom.

The polymerization catalyst may be deactivated for example by introduction of oxygen, water, methanol, ethanol or other alcohol, acetonitrile, or dilute aqueous HCl. Such catalyst deactivating agents may be added to the polymerization mixture or conversely the polymerization mixture may be added to the catalyst deactivating agent.

In some applications it may not be necessary to remove the catalyst residue from the polymer. The polymer when isolated by methods such as precipitation by addition of a nonsolvent may retain such minor amounts of catalyst residue that further removal of catalyst is not necessary. In other circumstances, it may be preferred to remove essentially all of the catalyst. Catalyst residue can be removed by repeated solubilization and precipitation of the polymer. Alternatively, catalyst residues may be removed by contacting a solution of the polymer with a solid which selectively absorbs or absorbs the catalyst residues.

The polymers of the instant invention are prepared by polymerization of diethynylsilanes in the presence of effective transition metal catalysts. Any transition metal catalyst can be used which effectively facilitates polymerization of diethynylsilanes to form polymers which are soluble, stable to the atmosphere, and have sufficient molecular weight to exhibit useful physical properties. Generally, transition metal catalysts which are known to be effective for polymerization of substituted acetylenes are considered the more promising candidates for polymerization of diethynylsilanes. Transition metal catalysts can be used alone or are also useful when combined with an organometallic cocatalyst. Transition metal catalysts include, but are not limited to $MoCl_5$, $Mo(CO)_6$-$CCl_4$-hv, $WCl_6$, $W(CO)_6$-$CCl_4$-hv, $NbCl_5$, $TaCl_5$. Usefull transition metal catalyst may also include isolable metal carbenes, for example, (phenylmethoxycarbene)pentacarbonyltungsten and (diphenylcarbene)pentacarbonyltungsten. Organometallic cocatalyst include, for example, $Ph_3Sb$, $Ph_3Bi$, $Ph_3SiH$, $(CH_3CH_2)_3SiH$, $Ph_4Sn$, and $(CH_3CH_2CH_2CH_2)_4Sn$ where Ph represents phenyl. Such transition metal catalysts for polymerization of substituted acetylenes are well known in the art and are described by Masuda et al., Acc. Chem. Res. 17, 51–56, (1984); Okano et al., J. Pol. Sci., 22, 1603–1610, (1984); and Masuda et al., Macromolecules, 22, 1036–1041, (1989).

However, the often unique nature of the effect provided by individual catalyst species makes it difficult to provide a well defined catalyst genus or fully encompassing list of catalyst species that effectively polymerize diethynylsilanes to produce the polymers of this invention. Individual catalyst species may not be effective with each monomer species or may not be effective under certain conditions under which other catalysts are effective. For example, some catalysts may be effective only in certain solvents or within a certain temperature range. Accordingly, experimentation to evaluate the effectiveness of individual catalyst may be performed by contacting the catalyst with a solution of diethynylsilane monomer under appropriate conditions as described previously and monitoring the mixture to determine if polymer is formed.

Catalyst such as $MoCl_5$ and $WCl_6$ are presently proving most useful in the polymerization of diethynylsilanes. Also, $TaCl_5$ and $NbCl_5$ have shown some moderate activity with respect to polymerization of diphenyldiethynylsilane and methylphenyldiethynylsilane respectively. Catalyst such as $Mo(CO)_6$ and $W(CO)_6$ are generally used in the presence of ultraviolet light and have been effective for polymerization of substituted acetylenes primarily when used in halogenated solvents such as $CCl_4$ and $CHCl_3$.

The amount of catalyst employed to polymerize the diethynylsilane is not particularly critical. Any amount of catalyst can be used which is effective to form polymers which are soluble, stable to the atmosphere, and have sufficient molecular weight to exhibit useful physical properties. Generally, 0.1 to 10% by weight of catalyst based on the weight of monomer may be employed to effect the polymerization. It is usually preferred to employ about 1 to 5% by weight of catalyst. To some extent, the amount of catalyst employed may be varied to modify or control the degree of polymerization.

Higher proportions of catalyst are expected to form more individual polymer molecules which then results in a polymer of overall lower molecular weight. Conversely, lower proportions of catalyst may be expected to favor higher average molecular weight.

The polymers of this invention which are soluble are preferred because they can be more readily processed into useful forms such as thin films and coatings. However, it may not be necessary that all of the polymer obtained from the polymerization reaction be soluble. Any soluble fraction or portion of the initially formed polymer can be separated from any insoluble portion. Such soluble polymer fraction is within the scope of the preferred polymers of this invention. By describing the polymers as soluble, it is intended to indicate that the polymers are soluble in one or more common solvents such as aromatics for example benzene, toluene, xylene and anisole; chlorinated hydrocarbons for example carbon tetrachloride and chloroform and hydrocarbons for example hexane, cyclohexane and heptane. Of course, it is not intended to indicate that the polymers are soluble in all common solvents since the polymers are typically insoluble in solvents such as alcohols for example methanol or ethanol.

The preferred polymers are also substantially stable to the atmosphere. Stability to air is advantageous since it allows use of the polymer in a broader range of applications without the need of systems and coatings for isolation of the polymer material from the atmosphere.

The polymers which exhibit useful physical properties typically vary in weight average molecular weight ($M_w$) from about 20,000 up to 200,000 and above as measured by GPC with respect to polystyrene standards. With respect to number average molecular weight ($M_n$), useful polymers generally have $M_n$ of 10,000 or greater when similarly measured. The molecular weight of the polymers will vary depending on the conditions used during the polymerization process and the particular transition metal catalyst employed to effect the polymerization.

The chemical structure of the polymers of this invention have not been thoroughly defined. It is believed that the polymer chain contains silacyclobutene-exo-ene units having a structure represented as

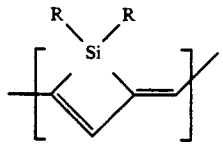

After one ethynyl group of the diethynylsilane adds to the active end of the growing polymer, a silacyclobutene-exo-ene unit may result from the intramolecular addition of the second ethynyl group prior to further polymer growth with an ethynyl group from another diethynylsilane molecule. NMR data for the polymers has been interpreted as consistent with the presence of amounts of about 45 to 75 mole percent of such units in polymers obtained by the polymerization process of this invention.

It is believed that the majority of the remaining units of the polymers may result from the intermolecular growth of the polymer chain prior to the intramolecular reaction of the second ethynyl group. Such a variation of the chain growth process produces polymer units having a structure represented as

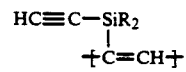

where the silicon is pendent to the polymer chain and bears an unreacted ethynyl group which is referred to as a "dangling" ethynyl group. Such dangling ethynyl groups are expected to be susceptible to further polymerization reaction which may lead to branching or cross linking of the polymer. Further reaction of a dangling ethynyl group produces a branching polymer unit having a structure represented as

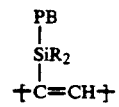

where PB denotes a polymer branch.

The polymers of this invention may contain the above units in a wide range of proportions. For example, a polymer may contain 75 mole percent silacyclobutene-exo-ene units, 8 mole percent dangling ethynyl units, and 17 mole percent branching units or a polymer may contain 42 mole percent silacyclobutene-exo-ene units, 26 mole percent dangling ethynyl units, and 32 mole percent branching units.

It should be understood that the structures proposed for the polymers are presented in so far as possible to assist others in understanding the invention but are not intended to limit the polymers of the invention to such structures. It should be understood that the polymers of this invention may, either exclusively or in combination with the proposed structures, contain other unit structures such as the silicon analogue of thiophene or still other, as yet undetermined structures.

The diethynylsilane polymer may be doped with a dopant such as iodine or arsenic pentafluoride to enhance its conductivity. Any of the oxidation dopants known for use in organic substrates such as polyacetylenes are potentially useful in the diethynylsilane polymers. The list of oxidative dopants continues to rapidly expand and includes, for example, $SbF_5$, $AlCl_3$, $ZrCl_4$, $FeCl_3$, $Br_2$, $IF_5$, $O_2$, $NO_2PF_6$, $NO_2SbF_6$, $(FSO_3)_2$, $MoCl_5$, and $WCl_6$.

In the preferred embodiment, a nonlinear optical polymeric material is formed from a polymerized diethynylsilane composition which has a molecular weight between about 20,000 and about 200,000 grams per mole, where the polymerized diethynylsilane composition is catalytically polymerized in the presence of a catalyst such as $MoCl_5$ or $W(CO)_6/h\nu$. Conductive material is also made from the same diethynylsilane composition as the nonlinear optical polymer.

Again, the polymer which includes repeating units containing a silacyclobutene structure in a predominantly polyacetylene chain arrangement has shown to be particularly useful. Nonlinear optical material which also consists predominantly of repeating units containing four-membered ring structures as described above are expected to be particularly useful.

It is to be understood that the polymers of this invention may be applicable to a host of applications in the nonlinear optical field as will be apparent to one of ordinary skill in the art. The following example further illustrates a method of producing a diethynylsilane polymer representative of the materials of the present invention.

EXAMPLE 1
POLYMERIZATION OF DI-SEC-BUTYLDIETHYNYLSILANE

A solution of 2.0 ml (1.70 g) di-sec-butyldiethynylsilane in 25 ml of anhydrous benzene was placed in an argon-flushed, 50 ml, one-necked, round-bottomed flask which was equipped with a magnetic stirrer and capped with a rubber septum. The solution was degassed by repeating a cycle of freezing and thawing under vacuum for four cycles, followed by covering with an argon atmosphere. 50 mg of $MoCl_5$ was added to the solution to act as a catalyst to immediately produce a deep violet-colored material. After magnetically stirring the solution at 60° C. for 15 hours, the polymerization was terminated by adding the solution to 150 ml of methanol drop by drop. The polymer which precipitated was separated by centrifugation and dried to a constant weight under vacuum over 24 hours. The polymer yield was about 50%.

Polymer films which were cast from a chloroform solution had a golden sheen. The films were tested and found to be electrical insulators, but when exposed to iodine vapors, they became electrically conducting with a conductivity of 0.1 S/cm. The films were found to be quite stable to the atmosphere and maintained their color, pliability and doped conduction ability after days of atmospheric exposure.

The polymer was characterized as follows:

Ultraviolet Spectrum $Lambda_{max}$ 565 nm; $Lambda^{sh}$ 600 nm.

Gel Permeation Chromatography: $M_w = 63,656$; (relative to polystyrene standards) $Pd = 1.81$.

Proton NMR: 0.994, 1.524, 6.2-7 ppm (broad peaks) (Solution NMR).

Carbon-13 NMR: 155.3, 145.5, 137.5, 24.15, 18.55, 12.

Silicon-29 NMR: $-1.20$ (all NMR spectra obtained in the solid state).

| Elemental Analysis: | | |
|---|---|---|
| | % C | % H |
| Calc. | 72.92 | 10.48 |
| Exp. | 70.00 | 9.82 |

An undoped portion of the polymer was tested for its nonlinear optical properties and structure. The third order susceptibility value was found to be very good. In addition, sub-picosecond switching speeds were exhibited by the polymer. The proposed structure is as follows:

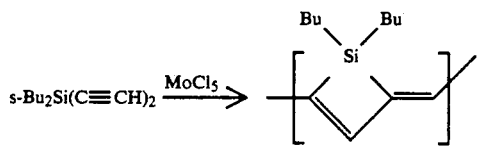

Furthermore, this violet polymer was found to be soluble in a variety of organic solvents and could be easily cast into a coherent film. Spectroscopic studies of the material revealed that the effective e-e interaction energy. ($U_{eef}$) was about 0.8 eV and Eg was about 2 eV.

EXAMPLE 2

Di-sec-butyldiethynylsilane (1.8 mL, 1.5 g) was added through a rubber septum to a dry, argon-flushed, 100 mL flask containing 50 mL of dry, freshly distilled toluene. The solution was degassed by four freeze/thaw cycles under vacuum and covered with argon. Tungsten hexachloride (0.12 g) was then added to the flask under an argon atmosphere. The solution was stirred and maintained at 60° C. for 9 hr. The solution changed to a deep purple color during the heating period. The polymerization was stopped by adding methanol (150 mL) dropwise to the solution. Upon addition of the methanol, polymer precipitated from the solution. The polymer was isolated by filtration and purified by repeated solubilization in dry toluene and precipitation with methanol until no residue of catalyst could be detected in the polymer by Electron Spin Resonance (ESR) or by X-Ray Energy Dispersive spectroscopy. The polymer was dried under vacuum to obtain a yield of 20%.

The polymer was dissolved in chloroform and cast into a film exhibiting a golden sheen. The film was electrically conductive (0.1 S/cm) upon doping with iodine. Even after several days exposure to open air, the film retained its color, pliability and doped conduction.

The polymer was characterized as follows:

Ultraviolet-Visible Spectrum: $Lambda_{max}$ 590 nm.

GPC: $M_w = 68,800$; $M_n = 16,000$; $Pd = 4.3$ (relative to polystyrene standards).

Proton NMR: 0.99, 1.52, 6.2-7.0 ppm (all broad signals).

Carbon-13 NMR: 157.5, 149.6, 146.4, 134.3, 95.9, 85.1, 24.9, 19.0, 13.8, 13.3 ppm.

Silicon-29 NMR: 2-10 (broad), $-1$ and $-2$ (sharp), $-8$ (broad) ppm.

All NMR spectra were obtained in high resolution liquid state NMR. All signals are referenced to external tetramethylsilane.

Thus, there is provided in accordance with the present invention, a polymeric material which exhibits highly enhanced nonlinear optical properties, which is stable in air, which is easily processable, has a high molecular weight, is stable at high temperatures and upon doping, exhibits conductivity in the range of $10^{-2}$ and $10^1$ S/cm.

While the invention has been described in terms of a few specific examples and configurations, it will be appreciated that other forms could readily be adapted by one skilled in the art. Accordingly, the scope of the invention is to be considered limited only by the following claims.

We claim:

1. A conductive polymeric material comprising a polymer doped with a dopant to enhance conductivity, the polymer having been formed by polymerization of a diethynylsilane by exposure to a catalyst and having a molecular weight between about 20,000 and about 200,000 grams per mole.

2. The material of claim 1, wherein the diethynylsilane has a structure represented by the formula

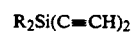

wherein each R is independently selected from the group consisting of aryl substituents and alkyl substituents of 1 to 20 carbon atoms.

3. The material of claim 1, wherein the diethynylsilane has a structure represented by the formula $$R_2Si(C\equiv CH)_2$$

wherein each R is independently selected from the group consisting of phenyl, ethyl, methyl, s-butyl, n-butyl, i-butyl, n-hexyl, i-propyl and n-propyl substituents.

4. The material of claim 1, wherein the catalyst is selected from the group consisting of $MoCl_5$ and $W(CO)_6/h\nu$.

5. The material of claim 3, wherein the dopant is an oxidative dopant effective to provide a conductivity for the material in the range of $10^{-2}$ to 10 S/cm.

6. The material of claim 5, wherein the oxidative dopant is selected from the group consisting of $I_2$, $AsF_5$, $SbF_5$, $AlCl_3$, $ZrCl_4$, $FeCl_3$, $Br_2$, $IF_5$, $O_2$, $NO_2PF_6$, $NO_2SbF_6$, $(FSO_3)_2$, $MoCl_5$, and $WCl_6$.

7. The material of claim 5, wherein the polymer comprises repeating units containing a silacyclobutene group with a predominantly polyacetylene chain structure.

8. The material of claim 7, wherein the polymer contains predominantly repeating units having a structure represented by the formula

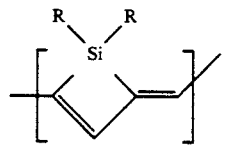

wherein each R may be selected from the group consisting of phenyl, s-butyl, n-butyl, ethyl, methyl, n-hexyl, i-propyl, and n-propyl substituents.

9. The material of claim 6, wherein the polymer comprises repeating units containing a silacyclobutene group with a predominantly polyacetylene chain structure.

10. The material of claim 9, wherein the polymer contains predominantly repeating units having a structure represented by the formula

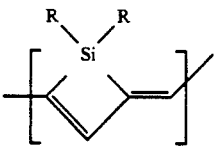

wherein each R may be selected from the group consisting of phenyl, s-butyl, n-butyl, ethyl, methyl, n-hexyl, i-propyl, and n-propyl substituents.

11. The material of claim 4, wherein the dopant is an oxidative dopant effective to provide a conductivity for the material in the range of $10^{-2}$ to 10 S/cm.

12. The material of claim 11, wherein the oxidative dopant is selected from the group consisting of $I_2$, $AsF_5$, $SbF_5$, $AlCl_3$, $ZrCl_4$, $FeCl_3$, $Br_2$, $IF_5$, $O_2$, $NO_2PF_6$, $NO_2SbF_6$, $(FSO_3)_2$, $MoCl_5$, and $WCl_6$.

13. The material of claim 11, wherein the polymer comprises repeating units containing a silacyclobutene group with a predominantly polyacetylene chain structure.

14. The material of claim 13, wherein the polymer contains predominantly repeating units having a structure represented by the formula

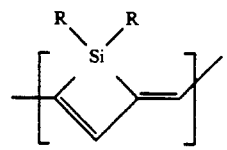

wherein each R may be selected from the group consisting of phenyl, s-butyl, n-butyl, ethyl, methyl, n-hexyl, i-propyl, and n-propyl substituents.

15. The material of claim 12, wherein the polymer comprises repeating units containing a silacyclobutene group with a predominantly polyacetylene chain structure.

16. The material of claim 15, wherein the polymer contains predominantly repeating units having a structure represented by the formula

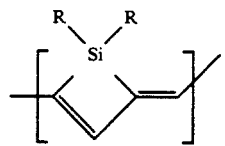

wherein each R may be selected from the group consisting of phenyl, s-butyl, n-butyl, ethyl, methyl, n-hexyl, i-propyl, and n-propyl substituents.

* * * * *

UNITED STATES PATENT AND TRADEMARK OFFICE
CERTIFICATE OF CORRECTION

PATENT NO. : 5,254,289
DATED : 10-19-93
INVENTOR(S) : Thomas J. Barton, et al.

It is certified that error appears in the above-indentified patent and that said Letters Patent is hereby corrected as shown below:

On the title page, item [73]:

ASSIGNEE:  IOWA STATE UNIVERSITY

SHOULD READ:  IOWA STATE UNIVERSITY RESEARCH FOUNDATION, INC.

Signed and Sealed this

Seventh Day of March, 1995

Attest:

BRUCE LEHMAN

*Attesting Officer*      *Commissioner of Patents and Trademarks*